(12) United States Patent
Xu et al.

(10) Patent No.: US 9,882,405 B2
(45) Date of Patent: Jan. 30, 2018

(54) BIDIRECTIONAL SWITCH CIRCUIT FOR POWER BANKS AND THE METHOD THEREOF

(71) Applicant: Chengdu Monolithic Power Systems Co., Ltd., Chengdu (CN)

(72) Inventors: Min Xu, Hangzhou (CN); Jielin Zhang, Shenzhen (CN); Xiaoli Kong, Hangzhou (CN); Yuancheng Ren, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 728 days.

(21) Appl. No.: 14/486,860

(22) Filed: Sep. 15, 2014

(65) Prior Publication Data

US 2015/0123480 A1    May 7, 2015

(30) Foreign Application Priority Data

Nov. 7, 2013    (CN) .......................... 2013 1 0548446

(51) Int. Cl.
*H02J 7/00*    (2006.01)
*H02J 9/06*    (2006.01)

(52) U.S. Cl.
CPC .......... *H02J 7/0068* (2013.01); *H02J 7/0063* (2013.01); *H02J 9/061* (2013.01); *Y10T 307/625* (2015.04)

(58) Field of Classification Search
CPC ........ H02J 7/0068; H02J 9/061; H02J 7/0063; Y10T 307/625
USPC .......................................................... 307/66
See application file for complete search history.

(56) References Cited

U.S. PATENT DOCUMENTS

| | | | |
|---|---|---|---|
| 2011/0121653 A1* | 5/2011 | Hartular ................... | H02J 1/10 307/66 |
| 2011/0148205 A1* | 6/2011 | Moon ........................ | H02J 3/32 307/65 |
| 2011/0175451 A1* | 7/2011 | Moon ....................... | H02J 9/062 307/66 |

FOREIGN PATENT DOCUMENTS

CN    101453157    6/2009

* cited by examiner

*Primary Examiner* — Richard Tan
(74) *Attorney, Agent, or Firm* — Perkins Coie LLP

(57) ABSTRACT

A power bank having an input terminal; an output terminal; a battery; a bidirectional switch circuit coupled between the battery and the output terminal of the power bank; and a select circuit coupled between the input terminal and the output terminal of the power bank; wherein when the input terminal is wired up with a power source, and the load is powered by the power source, and meanwhile, the battery is charged by the power source via the select circuit and the bidirectional switch circuit; when the input terminal is disconnected from the power source, the load is powered by the battery via the bidirectional switch circuit.

19 Claims, 7 Drawing Sheets

BIDIRECTIONAL SWITCH CIRCUIT FOR POWER BANKS AND THE METHOD THEREOF

CROSS-REFERENCE TO RELATED APPLICATION(S)

This application claims priority to and the benefit of Chinese Patent Application No. 201310548446.3, filed Nov. 7, 2013, which is incorporated herein by reference in its entirety.

STATEMENT REGARDING FEDERALLY SPONSORED RESEARCH

Not Applicable

APPENDICES

Not Applicable

TECHNICAL HELD

The present invention relates generally to electrical circuits, and more particularly but not exclusively to switch circuit, power bank using switch circuit and the control method thereof.

BACKGROUND

Power bank is a portable device that can be precharged and then charges other electrical devices like cell phones, pads and so on. A power bank normally comprises a battery and a control circuit thereof. FIG. 1 shows a block diagram of a prior art power bank 10. The power bank 10 comprises a charge circuit 101, a battery 102, a switch circuit 103, a select circuit 104 and a USB interface 105. In real application, when the power bank 10 is plugged, i.e., a power source Vsource is provided to the input terminal of the power bank 10, the battery 102 is charged by the power source Vsource via the charge circuit 101 while a load of the power bank 10 is powered by the power source Vsource via the select circuit 104 and the USB interface 105; when the power bank 10 is unplugged, i.e., the input terminal of the power bank 10 is disconnected from the power source Vsource, the load of the power bank 10 is powered by the battery 102 via the switch circuit 103, the select circuit 104 and the USB interface 105. The USB interface is configured to provide over voltage/current protection.

As shown in FIG. 1, the prior art power bank 10 comprises the battery 102, the charge circuit 101, the switch circuit 103, the select 104 and the USB interface 105 and so on. The system is complicated and the cost is high.

The present invention pertains to provide a power bank with simpler structure and lower cost.

SUMMARY

It is an object of the present invention to provide a switch circuit for power bank and the control method thereof.

In accomplishing the above and other objects, there has been provided, in accordance with an embodiment of the present invention, a bidirectional switch circuit, comprising: an inductor having a first terminal and a second terminal, wherein the first terminal is configured to receive a charge voltage, and the second terminal is coupled to a switch node; a low side power switch having a first terminal, a second terminal and a control terminal, wherein the first terminal is coupled to the switch node, the second terminal is coupled to a ground reference, and the control terminal is configured to receive a low side control signal; a high side power switch set having a first terminal, a second terminal, a third terminal, a fourth terminal and a control terminal, wherein the first terminal and the fourth terminal are coupled together to the switch node, the second terminal is configured to receive a discharge voltage, the third terminal is configured to receive the larger one of the charge voltage and the discharge voltage, and the control terminal is configured to receive a high side control signal; and a control circuit configured to provide the high side control signal and the low side control signal respectively to the high side power switch set and the low side power switch.

Furthermore, there has been provided, in accordance with an embodiment of the present disclosure, a power bank, comprising: an input terminal; an output terminal; a battery; a bidirectional switch circuit having a first terminal coupled to the battery, and a second terminal coupled to the output terminal of the power bank; and a select circuit having a first terminal coupled to the input terminal of the power bank, and a second terminal coupled to the output terminal of the power bank; wherein when the input terminal is wired up with a power source, the bidirectional switch circuit works under charge mode that the select circuit connects the input terminal to the output terminal, and the load is powered by the power source, and meanwhile, the battery is charged by the power source via the select circuit and the bidirectional switch circuit; when the input terminal is disconnected from the power source, the bidirectional switch circuit works under discharge mode that the select circuit disconnects the input terminal and the output terminal, and the load is powered by the battery via the bidirectional switch circuit.

In advance, there has been provided, in accordance with an embodiment of the present disclosure, a method for controlling a power bank, comprising: when the power bank is wired up with the power source, supplying power to a load of the power bank via the power source, and meanwhile, the power source charges a battery inside the power bank via a bidirectional switch circuit, wherein the voltage of the battery is lower than the voltage provided by the power source; and when the power bank is disconnected from the power source, regulating the voltage provided by the battery inside the power bank via the bidirectional switch circuit to supply power to the load, wherein the voltage of the battery may be lower or higher than the load voltage.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
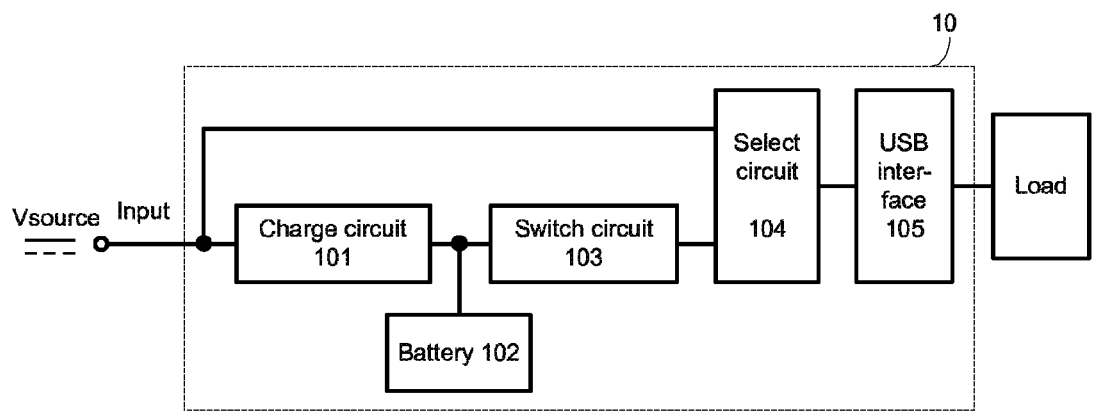
FIG. 1 shows a block diagram of a prior art power bank 10.
Figure 2:
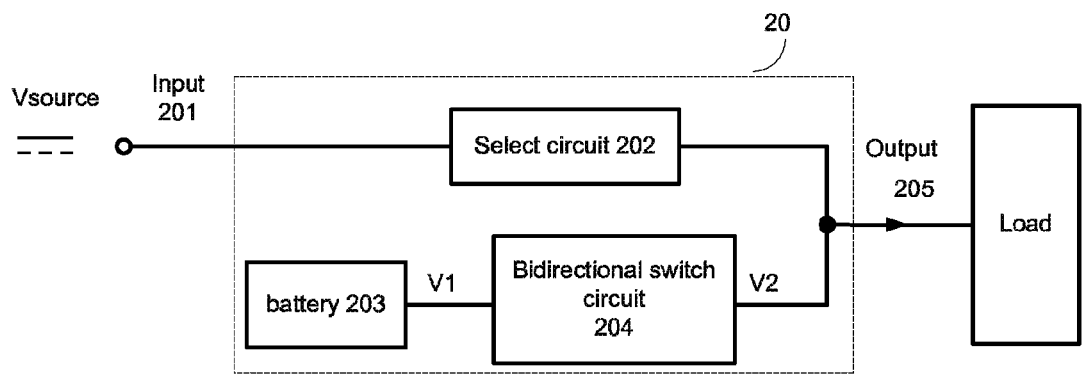
FIG. 2 shows a block diagram of a power bank 20 in accordance with an embodiment of the present invention.

FIG. 2 shows a block diagram of a power bank 20 in accordance with an embodiment of the present invention. The power bank 20 comprises: an input terminal 201 configured to receive a power source Vsource; an output terminal 205 configured to provide power to a load; a battery 203; a bidirectional switch circuit 204 having a first terminal coupled to the battery 203 and a second terminal coupled to the output terminal 205; and a select circuit 202 having a first terminal coupled to the input terminal 201 of the power bank 20, and a second terminal coupled to the output terminal 205 of the power bank 20.

In one embodiment, when the input terminal 201 is connected to the power source Vsource, the bidirectional switch circuit 204 works under charge mode. During this time, the select circuit 202 connects the input terminal 201 to the output terminal 205, and the load is powered by the power source Vsource. Meanwhile, the battery 203 is charged by the power source Vsource via the select circuit 202 and the bidirectional switch circuit 204. When the input terminal 201 is disconnected from the power source Vsource, the bidirectional switch circuit 204 works under discharge mode. During this time, the select circuit 202 disconnects the input terminal 201 and the output terminal 205, and the load is powered by the battery 203 via the bidirectional switch circuit 204. In a conclusion, the bidirectional switch circuit 204 works under charge mode when the battery 203 is charged, and works under discharge mode when the battery 203 provides power to the load.

Persons of ordinary skill in the art should know that the battery inside the power bank may be any energy storage component likes lithium battery and so on. Batteries adopted in the power bank and in the electrical devices used as the load may be both Lithium batteries which produce a voltage in a range of 2.7 Volts to 4.2 Volts. Normally, the voltage will decrease as the battery power is consumed. But the voltage of the power source is normally constant 5 volts. Thus, the bidirectional switch circuit 204 works under buck mode when the battery 203 is charged by the power source Vsource, which means that the input voltage of the bidirectional switch circuit 204 (a discharge voltage V2) is higher than the output voltage of the bidirectional switch circuit 204 (a charge voltage V1). When the load is powered by the battery 203, the bidirectional switch circuit 204 works under discharge mode as described before. Because the load voltage and the voltage of the battery 203 are unpredictable, the discharge mode comprises a buck discharge mode and a boost discharge mode. That is to say, when the voltage of the battery 203 is higher than the voltage of the load, the bidirectional switch circuit 204 works under buck discharge mode; otherwise, the bidirectional switch circuit 204 works under boost discharge mode.

Figure 3:
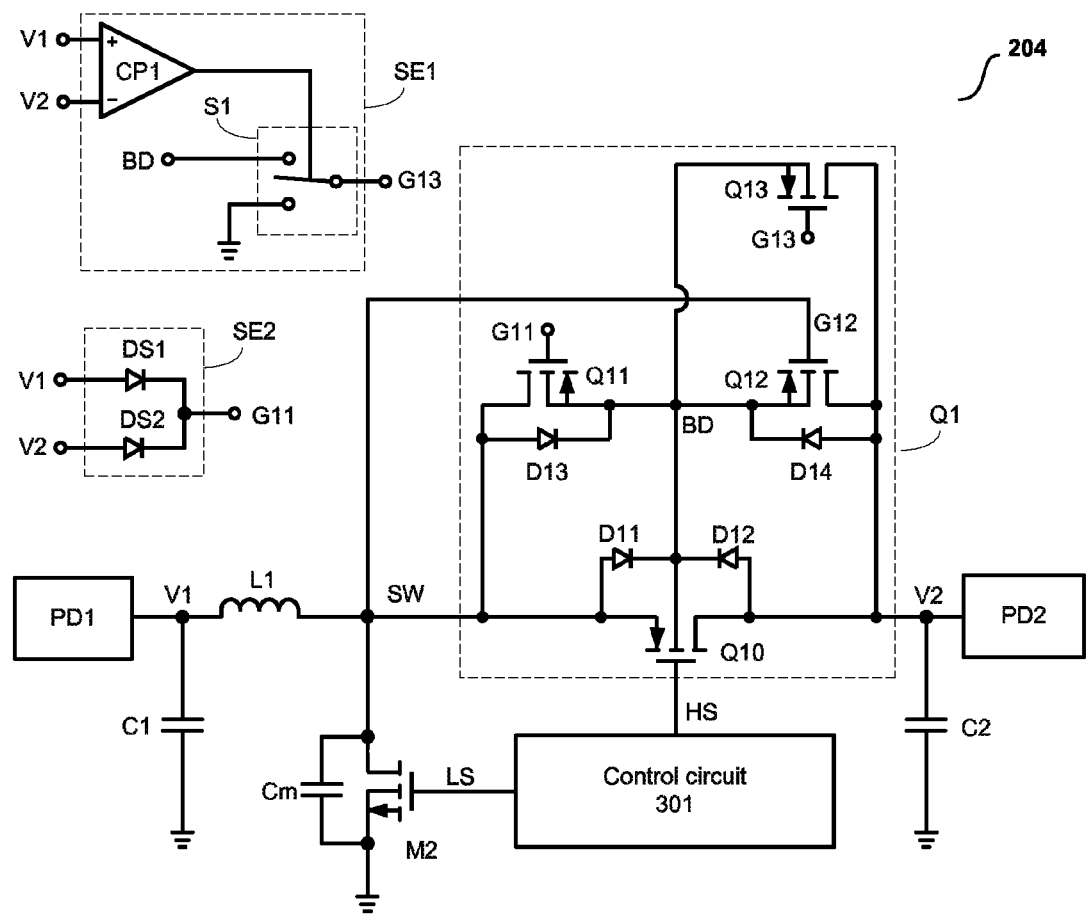
FIG. 3 schematically shows a bidirectional switch circuit 204 in accordance with an embodiment of the present invention.

FIG. 3 schematically shows a bidirectional switch circuit 204 in accordance with an embodiment of the present invention. As shown in FIG. 3, the bidirectional switch circuit 204 comprises: an inductor L1 having a first terminal and a second terminal, wherein the first terminal is coupled to a first power device PD1 to receive the charge voltage V1, and the second terminal is coupled to a switch node SW; a low side power switch M2 having a first terminal, a second terminal and a control terminal, wherein the first terminal is coupled to the switch node SW, the second terminal is coupled to a ground reference, and the control terminal is configured to receive a low side control signal LS; a high side power switch set Q1 having a first terminal, a second terminal, a third terminal, a fourth terminal and a control terminal, wherein the first terminal and the fourth terminal are coupled together to the switch node SW, the second terminal is coupled to a second power device PD2 to receive the discharge voltage V2, the third terminal is configured to receive the larger one of the charge voltage V1 and the discharge voltage V2, and the control terminal is configured to receive a high side control signal HS; and a control circuit 201 configured to provide the high side control signal HS and the low side control signal respectively to the high side power switch set 01 and the low side power switch M2.

When the bidirectional switch circuit 204 in FIG. 3 is used with the power bank 20 in FIG. 2, the first power device PD1 represents the battery 203, and the second power device PD2 represents the power source Vsource or the load at the output terminal 205. To be specific, the second power device PD2 represents the power source Vsource when the bidirectional switch circuit 204 works under charge mode, and represents the load when the bidirectional switch circuit 204 works under discharge mode. The charge voltage V1 indicates the voltage at the connection node of the first power device PD1 and the bidirectional switch circuit 204, while the discharge voltage V2 indicates the voltage at the connection node of the second power device PD2 and the bidirectional switch circuit 204.

In one embodiment, the high side power switch set Q1 comprises: a high side power switch Q10 having a first terminal, a second terminal, a third terminal BD and a control terminal, wherein the first terminal is coupled to the switch node SW, the second terminal is configured to receive the discharge voltage V2, and the control terminal is configured to receive the high side control signal HS; a first auxiliary switch Q11 having a first terminal, a second terminal and a control terminal G11, wherein the first terminal is coupled to the third terminal BD of the high side power switch Q10, the second terminal is coupled to the switch node SW, and the control terminal G11 is configured to receive the larger one of the charge voltage V1 and the discharge voltage V2; a second auxiliary switch Q12 having a first terminal, a second terminal and a control terminal G12, wherein the first terminal is coupled to the third terminal BD of the high side power switch Q10, the second terminal is configured to receive the discharge voltage V2, and the control terminal G12 is coupled to the switch node SW; and a third auxiliary switch Q13 having a first terminal, a second terminal and a control terminal G13, wherein the first terminal is coupled to the third terminal BD of the high side power switch Q10, the second terminal is configured to receive the discharge voltage V2, and the control terminal G13 is coupled to the third terminal BD of the high side power switch Q10 when the charge voltage V1 is higher than or equal to the discharge voltage V2, and is coupled to the ground reference when the charge voltage V1 is lower than the discharge voltage V2.

In one embodiment, the high side power switch Q10, the first auxiliary switch Q11, the second auxiliary switch Q12 and the third auxiliary switch Q13 comprise enhancement mode P-MOSFET (P-type Metal Oxide Semiconductor Field Effect Transistor). In one embodiment, the high side power switch Q10, the first auxiliary switch Q11 and the second auxiliary switch Q12 respectively has a threshold voltage Vth0, Vth1 and Vth2. Because the high side power switch Q10, the first auxiliary switch Q11 and the second auxiliary switch Q12 are enhancement mode transistors, the threshold voltage Vth0, Vth1 and Vth2 are higher than 0. Persons of ordinary skill in the art know that the enhancement mode P-MOSFET will be turned ON when its source-gate voltage Vsg (the voltage between the source terminal and the gate terminal) is higher than its threshold voltage, while an enhancement mode N-MOSFET will be turned ON when its gate-source voltage Vgs (the voltage between the gate terminal and the source terminal) is higher than its threshold voltage. The control terminal of the high side power switch Q10 is also referred as the gate terminal, and the third terminal BD of the high side power switch Q10 is also referred as the body terminal. The high side power switch Q10 further comprises body diodes D11 and D12 coupled as shown in FIG. 3. Meanwhile, the first auxiliary switch Q11 further comprises a body diode D13, and the second auxiliary switch Q12 further comprises a body diode D14 coupled as shown in FIG. 3.

In one embodiment, the low side power switch M2 further comprises a parasitic capacitor Cm coupled in parallel with the low side power switch M2.

In one embodiment, the bidirectional switch circuit 204 further comprises a charge filter capacitor C1 coupled between the first terminal of the inductor L1 and the ground reference and a discharge filter capacitor C2 coupled between the second terminal of the high side power switch Q10 and the ground reference. In one embodiment, the charge filter capacitor C1 is included in the first power device PD1, and the discharge filter capacitor C2 is included in the second power device PD2.

The operation of the bidirectional switch circuit 204 is described with reference to FIGS. 2 & 3.

When the power bank 20 is wired up with the power source Vsource, the power source Vsource provides power to the load and meanwhile charges the battery 203. The bidirectional switch circuit 204 works under charge mode. Thus the discharge voltage V2 corresponds to the power source Vsource and the charge voltage V1 corresponds to the voltage of the battery 203. The high side power switch Q10 and the low side power switch M2 are turned on and off alternatively under the control of the control circuit 301. As described before, the voltage of the battery 203 is normally lower than the voltage provided by the power source Vsource, i.e., the charge voltage V1 is lower than the discharge voltage V2, thus the control terminal G13 of the third auxiliary switch Q13 is coupled to the ground reference, and the third auxiliary switch Q13 is turned on. As a result, the second auxiliary switch Q12 and the body diode D12 are bypassed, and the body terminal BD of the high side power switch Q10 is connected to the second terminal of the high side power switch Q10 and the body potential of the high side power switch Q10 is determined. Because the charge voltage V1 is lower than the discharge voltage V2, the control terminal G11 of the first auxiliary switch Q11 receives the discharge voltage V2. During this time, the first terminal of the first auxiliary switch Q11 receives the discharge voltage V2 via the third auxiliary switch Q13. As a result, the source-gate voltage Vsg of the first auxiliary switch Q11 is 0, which is lower than the threshold voltage Vth1. So the first auxiliary switch Q11 is turned off. In a conclusion, the high side power switch set Q1 is equivalent to the high side power switch Q10 with the body diode D11 having an anode terminal coupled to the switch node SW and a cathode terminal coupled to the discharge voltage V2 under the charge mode.

Under the charge mode, when the high side power switch Q10 is turned on and the low side power switch M2 is turned off, the power source Vsource charges the battery 203 and the charge filter capacitor C1 via the inductor L1; when the high side power switch Q10 is turned off and the low side power switch M2 is turned on, the inductor L1 charges the charge filter capacitor C1 while the charge filter capacitor C1 powers the load. During this time, the bidirectional switch circuit 204 works like a conventional BUCK converter.

When the power bank 20 is unplugged from the power source Vsource, the battery 203 powers the load via the bidirectional switch circuit 204 and the bidirectional switch circuit 20 works under discharge mode. Thus the discharge voltage V2 corresponds to the voltage of the load and the charge voltage V1 corresponds to the voltage of the battery 203. If the voltage of the battery 203 is lower than the voltage of the load, i.e., the discharge voltage V2 is lower than the charge voltage V1, the bidirectional switch circuit 20 works under boost discharge mode. The high side power switch Q10 and the low side power switch M2 are turned on and off alternatively under the control of the control circuit 301. During this time, because the charge voltage V1 is lower than the discharge voltage V2, and the control terminal G13 of the third auxiliary switch Q13 is coupled to the ground reference. As a result, the third auxiliary switch Q13 is turned on to bypass the second auxiliary switch Q12 and the body diode D12. Then the body terminal BD of the high side power switch Q10 is coupled to the second terminal of the high side power switch Q10, and the body potential of the high side power switch Q10 is fixed to V2. Because the charge voltage V1 is lower than the discharge voltage V2, the control terminal G11 of the first auxiliary switch Q11 receives the discharge voltage V2. Because the first terminal of the first auxiliary switch Q11 also receives the discharge voltage V2 via the third auxiliary switch Q13, the source gate voltage Vsg of the first auxiliary switch Q11 is 0, which is lower than the threshold voltage Vth1. As a result, the first auxiliary switch Q11 is turned off. In a conclusion, the high side power switch set Q1 is equivalent to the high side power switch Q10 with the body diode D11 having an anode terminal coupled to the switch node SW and a cathode terminal coupled to the discharge voltage V2 under the boost discharge mode.

Under the boost discharge mode, when the high side power switch Q10 is turned off and the low side power switch M2 is turned on, the battery 203 powers the load via the inductor L1, and meanwhile charges the discharge filter capacitor C2; when the high side power switch Q10 is turned on and the low side power switch M2 is turned off, the battery 203 powers the load via the inductor L1 and the high side power switch Q10, and meanwhile charges the discharge filter capacitor C2. During this time, the bidirectional switch circuit 204 works like a conventional BOOST converter.

Persons of ordinary skill in the art should know that a conventional boost converter can only converter a low voltage to a high voltage. In the present invention, the configuration of the high side power switch set Q1 makes the bidirectional switch circuit 204 work properly when the charge voltage V1 is higher than the discharge voltage V2, i.e., the battery 203 could power the load when the voltage of the load is lower than the voltage of the battery 203. During this time, the bidirectional switch circuit 204 works under buck discharge mode.

Under buck discharge mode, the charge voltage V1 is higher than the discharge voltage V2. As a result, the control terminal G13 of the third auxiliary switch Q13 is coupled to the body terminal BD of the high side power switch Q10. That means the third auxiliary switch Q13 has the control terminal G13 and the first terminal coupled together. Thus the source gate voltage Vsg of the third auxiliary switch Q13 is 0, which is lower than the threshold voltage Vth3. As a result, the third auxiliary switch Q13 is turned off.

Under buck discharge mode, the high side control signal HS is supposed to be equal to the charge voltage V1, so the high side power switch Q10 is turned off. The low side control signal LS is a square signal that turns on and off the low side power switch M2 with a certain duty cycle. When the low side power switch M2 is turned on, the battery 203 provides a current to the ground reference via the inductor L1 and the low side power switch M2. Thus the inductor L1 stores energy. During this time, the switch node SW is coupled to the ground reference, and the voltage Vsw at the switch node SW is almost zero. So the source gate voltage Vsg of the second auxiliary switch Q12 is almost zero and is lower than the threshold voltage Vth2, and the second auxiliary switch Q12 is turned off. Because the charge voltage V1 is higher than the discharge voltage V2, the control terminal G11 of the first auxiliary switch Q11 receives the charge voltage V1. Since the voltage at the first terminal (switch node SW) and the second terminal of the first auxiliary switch Q11 is lower than the charge voltage V1, the first auxiliary switch Q11 is turned off too. When the low side power switch M2 is turned off, the current provided by the battery 203 flows through the inductor L1 and the parasitic capacitor Cm. Thus the voltage across the parasitic capacitor Cm, i.e., the voltage Vsw at the switch node SW increases. When the voltage Vsw is higher than the charge voltage V1, and makes the drain gate voltage Vdg be higher than the threshold voltage Vth1, i.e., Vsw−V1≥Vth1, the first auxiliary switch Q11 is turned on to connect the body terminal BD of the high side power switch Q10 to the switch node SW. Thus the body potential of the high side power switch Q10 is fixed to Vsw. The high side control signal HS is equal to the charge voltage V1 and the threshold voltage of the P-type MOSFET is approximately equal, i.e., Vth0≈Vth1, so Vsw−V1≥Vth0. Thus, the high side power switch Q10 is turned on as the first auxiliary switch Q11 is turned on, to transfer the energy stored in the inductor L1 to the load. After that, the voltage Vsw at the switch node SW decreases. When Vsw−V1<Vth1, the first auxiliary switch Q11 and the high side power switch Q10 are turned off, and the energy transfer is over. The energy transferred to the load could be regulated by changing the duty cycle of the low side power switch M2. Thus the battery 203 could power the load via the bidirectional switch circuit 204 when the charge voltage V1 is higher than the discharge voltage V2 which represents the load voltage here.

The high side power switch in a conventional boost converter normally comprises a diode with an anode terminal coupled to the inductor L1 and a cathode terminal coupled to the output terminal of the boost converter. When the output of the boost converter is shorted, the diode is shot through, and the input of the boost converter is also shorted to the ground. This will cause severe problems, like burning of the circuit. In the present invention, the high side power switch set Q1 instead of a single high side power switch is adopted in the bidirectional switch circuit 204, so that the input of the bidirectional switch circuit 204 will not be shorted to ground even when the output is shorted because of the body diode D14. Thus, the built-in flaw (short problem) of the boost converter may be overcome by adopting the high side power switch set 01.

As described before, under discharge mode, the bidirectional switch circuit 204 works as a boost converter. But unlike the conventional boost converter, the bidirectional switch circuit 204 could provide an output voltage lower than or higher than the input voltage. Meanwhile, the bidirectional switch circuit 204 overcomes the built-in short-circuit fault of the conventional boost converter.

The bidirectional switch circuit 204 further comprises a first select circuit SE1 and a second select circuit SE2.

In one embodiment, the second select circuit SE1 comprises: a comparator CP1 having a first input terminal configured to receive the charge voltage V1, a second input terminal configured to receive the discharge voltage V2, and an output terminal configured to provide a comparison result based on the charge voltage V1 and the discharge voltage V2; a switch S1 having a first terminal coupled to the body terminal BD of the high side power switch Q10, a second terminal coupled to the ground reference, a control terminal coupled to the output terminal of the comparator CP1, and an output terminal coupled to the control terminal G13 of the third auxiliary switch Q13, wherein the control terminal of the third auxiliary switch Q13 is coupled to the body terminal BD of the high side power switch Q10 via the output terminal of the switch S1 when the charge voltage V1 is higher than the discharge voltage V2, and the control terminal of the third auxiliary switch Q13 is coupled to the ground reference via the output terminal of the switch S1 when the charge voltage V1 is lower than the discharge voltage V2.

In one embodiment, the switch S1 comprises a single-pole double-throw switch.

In one embodiment, the first select circuit SE2 comprises diodes DS1 and DS2. The diode DS1 has an anode terminal configured to receive the charge voltage V1, and a cathode terminal coupled to the control terminal G11 of the first auxiliary switch Q11. The diode DS2 has an anode terminal configured to receive the discharge voltage V2, and a cathode terminal coupled to the control terminal G11 of the first auxiliary switch Q11 too. When the charge voltage V1 is higher than the discharge voltage V2, the diode DS1 is conducted, and the diode DS2 is cut-off. At this time, the control terminal G11 of the first auxiliary switch Q11 receives the charge voltage V1. When the charge voltage V1 is lower than the discharge voltage V2, the diode DS1 is cut-off, and the diode DS2 is conducted. At this time, the control terminal of the first auxiliary switch Q11 receives the discharge voltage V2.

The first select circuit SE1 and the second select circuit SE2 may have other structures. Any circuit that controls the output or the connection based on the comparison of two voltage signals may be used without detracting from the merits of the present invention.

Figure 4:
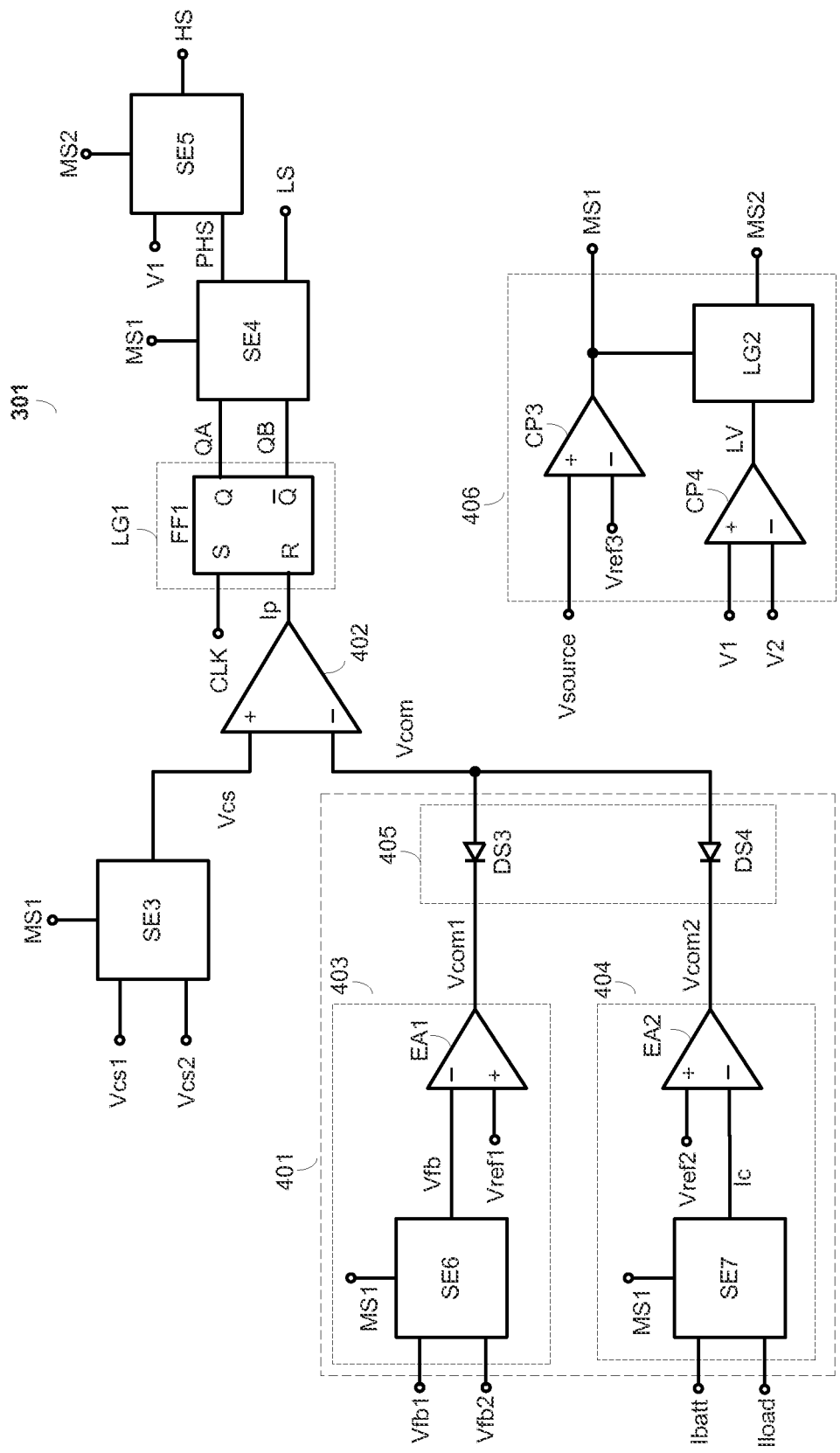
FIG. 4 schematically shows a control circuit 301 in accordance with an embodiment of the present invention.

FIG. 4 schematically shows a control circuit 301 in accordance with an embodiment of the present invention. As shown in FIG. 4, the control circuit 301 comprises: a current sense signal select circuit SE3, having a first input terminal configured to receive the charge mode current sense signal Vcs1, a second input terminal configured to receive the discharge mode current sense signal Vcs2, a control terminal configured to receive a first mode select signal MS1, and an output terminal configured to provide the charge mode current sense signal Vcs1 or the discharge mode current sense signal Vcs2 as the current sense signal Vcs based on the first mode select signal MS1; a CV-CC (constant-voltage and constant-current) control circuit 401 having a first input terminal configured to receive a charge voltage feedback signal Vfb1 indicative of the charge voltage V1, a second input terminal configured to receive a discharge voltage feedback signal Vfb2 indicative of the discharge voltage V2, a third input terminal configured to receive a charge current feedback signal Ibatt indicative of a current flowing through the battery 203 (the first power device P01), a fourth input terminal configured to receive a discharge current feedback signal Iload indicative of a current flowing through the load, a fifth input terminal configured to receive the first mode select signal MS1, and an output terminal configured to provide a CV-CC compensation signal Vcom based on the charge voltage feedback signal Vfb1, the discharge voltage feedback signal Vfb2, the charge current feedback signal Ibatt, the discharge current feedback signal Iload and the first mode select signal MS1; a comparison circuit 402 having a first input terminal coupled to the current sense signal select circuit SE3 to receive the current sense signal Vcs, a second input terminal coupled to the CV-CC control circuit 401 to receive the CV-CC compensation signal Vcom, and an output terminal configured to provide a peak current control signal Ip based on the current sense signal Vcs and the CV-CC compensation signal Vcom; a first logic circuit LG1 having a first input terminal configured to receive a clock signal CLK, a second input terminal coupled to the comparison circuit 402 to receive the peak current control signal Ip, a first output terminal configured to provide a first control signal QA and a second output terminal configured to provide a second control signal QB based on the dock signal CLK and the peak current control signal Ip; a low side control signal select circuit SE4 having a first input terminal coupled to the first output terminal of the first logic circuit LG1 to receive the first control signal QA, a second input terminal coupled to the second output terminal of the first logic circuit LG1 to receive the second control signal QB, a control terminal configured to receive the first mode select signal MS1, a first output terminal configured to provide a high side control select signal PHS and a second output terminal configured to provide the low side control signal LS based on the first control signal QA, the second control signal QB and the first mode select signal MS1; and a high side control signal select circuit SE5 having a first input terminal configured to receive the charge voltage signal V1, a second input terminal coupled to the low side control signal select circuit SE4 to receive the high side control select signal PHS, a control terminal configured to receive a second mode select signal MS2, and an output terminal configured to provide the high side control signal HS based on the charge voltage V1, the high side control select signal PHS and the second mode select signal MS2; wherein the bidirectional switch circuit 204 works under the charge mode when the first mode select signal MS1 is valid, works under boost discharge mode when both of the first mode select signal MS1 and the second mode select signal MS2 are invalid, and works under buck discharge mode when the first mode select signal MS1 is invalid and the second mode select signal MS2 is valid.

In one embodiment, the charge mode current sense signal Vcs1 indicates a current flowing through the high side power switch Q10, and the discharge mode current sense signal Vcs2 indicates a current flowing through the low side power switch M2.

In one embodiment, the first mode select signal MS1 and the second mode select signal MS2 are valid when they are logical high; the first mode select signal MS1 and the second mode select signal MS2 are invalid when they are logical low. Persons of ordinary skill in the art should know that the valid/invalid state may be indicated by different logic level.

In one embodiment, the first logic circuit LG1 comprises a RS flip-flop FF1 having a set terminal "S", a reset terminal "R", a positive output terminal "Q" and a negative output terminal "$\overline{Q}$", wherein the set terminal "S" is configured to receive the dock signal CLK, the reset terminal "R" is coupled to the comparison circuit 402 to receive the peak current control signal Ip, and based on the dock signal CLK and the peak current control signal Ip, the RS flip-flop FF1 provides the first control signal QA at the positive output terminal "0", and provides the second control signal QB having an opposite phase to the first control signal QA at the negative output terminal "$\overline{Q}$".

In one embodiment, the control circuit 301 further comprises a mode select circuit 406 having a first input terminal coupled to the input terminal 201 of the power bank 20 to receive the power source Vsource, a second input terminal configured to receive the charge voltage V1, a third input terminal configured to receive the discharge voltage V2, wherein based on the power source Vsource, the charge voltage V1 and the discharge voltage V2, the mode select circuit 406 provides the first mode select signal MS1 at a first output terminal and provides the second mode select signal MS2 at a second output terminal.

In one embodiment, the mode select circuit 406 comprises: a power source detect comparator CP3 having first input terminal coupled to the input terminal 201 of the power bank 20 to receive the power source Vsource, a second input terminal configured to receive a power source reference signal Vref3, and an output terminal configured to provide the first mode select signal MS1 based on the power source Vsource and the power source reference signal Vref3; a voltage detect comparator CP4 having a first input terminal configured to receive the charge voltage V1, a second input terminal configured to receive the discharge voltage V2, and an output terminal configured to provide a low voltage indicating signal LV based on the charge voltage V1 and the discharge voltage V2; and a second logic circuit LG2 having a first input terminal coupled to the power source detect comparator CP3 to receive the first mode select signal MS1, a second input terminal coupled to the voltage detect comparator CP4 to receive the low voltage indicating signal LV, and an output terminal configured to provide the second mode select signal MS2 based on the first mode select signal MS1 and the low voltage indicating signal LV; wherein, when the first mode select signal MS1 is invalid and the low voltage indicating signal LV indicates that the discharge voltage V2 is lower than the charge voltage V1, the second mode select signal MS2 is valid; otherwise, the second mode select signal MS is invalid.

There are several ways to implement the second logic circuit LG2. In one embodiment, the first mode select signal MS1 is invalid when it is logical high, meanwhile, the low voltage indicating signal LV is logical high when the discharge voltage V2 is lower than the charge voltage V1. In that case, the second logic circuit LG2 comprises an AND gate receives the first mode select signal MS1 and the low voltage indicating signal LV, and the second mode select signal MS2 provided by the AND gate is valid when the first mode select signal MS1 and the low voltage indicating signal LV are both logical high. Persons of ordinary skill in the art should know that the first mode select signal MS1, the second mode select signal MS2, and the low voltage indicating signal LV may represent the valid/invalid state by different logic level. Thus, the second logic circuit LG may comprise combinational of different digital circuits.

In one embodiment, the high side control signal select circuit SE5 selects the charge voltage V1 as the high side control signal HS when the first mode select signal MS1 is invalid and the second mode select signal MS2 is valid, i.e., the bidirectional switch circuit 204 works under buck discharge mode; the high side control signal select circuit SE5 selects the high side control select signal PHS as the high side control signal HS when the first mode select signal MS1 and the second mode select signal MS2 are both invalid, i.e., the bidirectional switch circuit 204 works under boost discharge mode or charge mode.

In one embodiment, when the input terminal 201 of the power bank 20 is wired up with the power source Vsource, the first mode select signal MS1 is valid and the bidirectional switch circuit 204 works under charge mode. During this time, the current sense signal select circuit SE3 selects the charge mode current sense signal Vcs1 as the current sense signal Vcs based on the first mode select signal MS1. The comparison circuit 402 compares the current sense signal Vcs with the CV-CC compensation signal Vcom provided by the CV-CC control circuit 401 to generate the peak current control signal Ip.

In one embodiment, during when the bidirectional switch circuit 204 works under charge mode, the clock signal CLK sets the RS flip-flop FF1 at the beginning of a switching cycle. Thus the initial value of the first control signal QA is logical high and the initial value of the second control signal QB is logical low. Based on the first mode select signal MS1, the low side control signal select circuit SE4 selects the second control signal QB as the low side control signal LS and selects the first control signal QA as the high side control select signal PHS. Based on the second mode select signal MS2, the high side control signal select circuit SE5 selects the high side control select signal PHS as the high side control signal HS. Based on the high side control signal HS and the low side control signal LS, the high side power switch Q10 is turned on and the low side power switch M2 is turned off. At this time, the power source Vsource charges the battery 203 via the inductor L1, and the current flowing through the inductor L1, i.e., the current flowing through the high side power switch Q10, increases. Thus, the current sense signal Vcs increases. When the current sense signal Vcs reaches the CV-CC compensation signal Vcom, the peak current control signal Ip becomes logical high to reset the RS flip-flop. As a result, the first control signal QA becomes logical low and the second control signal QB becomes logical high. Based on the first mode select signal MS1, the low side control signal select circuit SE4 selects the second control signal QB as the low side control signal LS and selects the first control signal QA as the high side control select signal PHS. Based on the second mode select signal MS2, the high side control signal select circuit SE5 selects the high side control select signal PHS as the high side control signal HS. Based on the high side control signal HS and the low side control signal LS, the high side power switch Q10 is turned off and the low side power switch M2 is turned on. At this time, the current flowing through the inductor L1 decreases, so does the current sense signal Vcs. At the beginning of the next switching cycle, the RS flip-flop FF1 is set by the clock signal CLK again, and the operation repeats. The operation of the bidirectional switch circuit 204 now is similar with the operation of a conventional buck converter.

In one embodiment, the CV-CC control circuit 401 comprises: a CV control circuit 403 having a first input terminal configured to receive the charge voltage feedback signal Vfb1 indicative of the charge voltage V1, a second input terminal configured to receive the discharge voltage feedback signal Vfb2 indicative of the discharge voltage V2, a control terminal configured to receive the first mode select signal MS1, and an output terminal configured to provide a CV compensation signal Vcom1 based on the charge voltage feedback signal Vfb1, the discharge voltage feedback signal Vfb2, and the first mode select signal MS1; a CC control circuit 404 having a first input terminal configured to receive the charge current feedback signal Ibatt indicative of the battery current, a second input terminal configured to receive the discharge current feedback signal Iload indicative of the load current, a control terminal configured to receive the first mode select signal MS1, and an output terminal configured to provide a CC compensation signal Vcom2 based on the charge current feedback signal Ibatt, the discharge current feedback signal Iload and the first mode select signal MS1; and a compensation signal select circuit 405 having a first input terminal coupled to the CV control circuit 403 to receive the CV compensation signal Vcom1, a second input terminal configured to receive the CC compensation signal Vcom2, and an output terminal configured to provide the CV-CC compensation signal Vcom based on the CV compensation signal Vcom1 and the CC compensation signal Vcom2.

When the control circuit 301 is applied in the power bank 20, the battery 203 is charged or charges the load. The charge operation comprises a constant current (CC) operation and a constant voltage (CV) operation. Assuming the power source Vsource charges the battery 203. During the constant current operation, the battery 203 is charged by a constant current until the voltage of the battery 203 reaches a preset value. During the constant voltage operation, the battery 203 will be charged a smaller current, and the voltage of the battery 203 is unchanged.

In one embodiment, the CC compensation signal Vcom2 is lower than the CV compensation signal Vcom1 during the CC operation, and the CC compensation signal Vcom2 is higher than the CV compensation signal Vcom1 during the CV operation. The compensation signal select circuit 405 comprises: a first select diode DS3 having an anode terminal and a cathode terminal, wherein the cathode terminal is coupled to the CV control circuit 403 to receive the CV compensation signal Vcom1; and a second select diode DS4 having an anode terminal and a cathode terminal, wherein the cathode terminal is coupled to the CC control circuit 404 to receive the CC compensation signal Vcom2; wherein the anode terminals of the first select diode DS3 and the second select diode DS4 are coupled together to provide the CV-CC compensation signal Vcom. In one embodiment, when the CC compensation signal Vcom2 is lower than the CV compensation signal Vcom1, the compensation signal select circuit 405 selects the CC compensation signal Vcom2 as the CV-CC compensation signal Vcom; otherwise, the compensation signal select circuit 405 selects the CV compensation signal Vcom1 as the CV-CC compensation signal Vcom. Thus the CC operation goes before the CV operation.

In one embodiment, the CV control circuit 403 comprises: a voltage feedback signal select circuit SE6 having a first input terminal configured to receive the charge voltage feedback signal Vfb1, a second input terminal configured to receive the discharge voltage feedback signal Vfb2, a control terminal configured to receive the first mode select signal MS1, and an output terminal configured to provide the charge voltage feedback signal Vfb1 as the voltage feedback signal Vfb when the first mode select signal MS1 is valid, and to provide the discharge voltage feedback signal Vfb2 as the voltage feedback signal Vfb when the first mode select signal MS1 is invalid; and a feedback voltage error amplifier EA1 having a first input terminal (inverting input terminal) coupled to the voltage feedback signal select circuit SE6 to receive the voltage feedback signal Vfb, a second input terminal (non-inverting input terminal) configured to receive a feedback voltage reference signal Vref1, and an output terminal configured to provide the CV compensation signal Vcom1 based on the voltage feedback signal Vfb and the feedback voltage reference signal Vref1.

In one embodiment, the CC control circuit 404 comprises: a current feedback signal select circuit SE7 having a first input terminal configured to receive the charge current feedback signal Ibatt, a second input terminal configured to receive the discharge current feedback signal Iload, a control terminal configured to receive the first mode select signal MS1, and an output terminal configured to provide the charge current feedback signal Ibatt as the current feedback signal Ic when the first mode select signal MS1 is valid, and to provide the discharge current feedback signal Iload as the current feedback signal Ic when the first mode select signal MS1 is invalid; and a feedback current error amplifier EA2 having a first input terminal (inverting input terminal) coupled to the current feedback signal select circuit SE7 to receive the current feedback signal Ic, a second input terminal (non-inverting input terminal) configured to receive a feedback current reference signal Vref2, and an output terminal configured to provide the CC compensation signal Vcom2 based on the current feedback signal Ic and the feedback current reference signal Vref2.

Under charge mode, the charge voltage V1 is fixed to implement the CV control by fixing the charge voltage feedback signal Vfb1 at a constant value via the error amplifier EA1. Meanwhile, the charge current (the current charges the battery 203) is fixed to implement the CC control by fixing the charge current feedback signal Ibatt at a constant value via the error amplifier EA2.

When the load voltage is higher than the voltage of the battery 203, i.e., the discharge voltage V2 is higher than the charge voltage V1, the bidirectional switch circuit 204 works under boost discharge mode, and the second mode select signal MS2 is invalid. At this time, the current sense signal select circuit SE3 selects the discharge mode current sense signal Vcs2 as the current sense signal Vcs to the comparison circuit 402 based on the first mode select signal MS1. The comparison circuit 402 compares the current sense signal Vcs with the CV-CC compensation signal Vcom to generate the peak current control signal Ip.

In one embodiment, during when the bidirectional switch circuit 204 works under boost discharge mode, the clock signal CLK sets the RS flip-flop FF1 at the beginning of a switching cycle. Thus the initial value of the first control signal QA is logical high and the initial value of the second control signal QB is logical low. Based on the first mode select signal MS1, the low side control signal select circuit SE4 selects the first control signal QA as the low side control signal LS and selects the second control signal QB as the high side control select signal PHS. Based on the second mode select signal MS2, the high side control signal select circuit SE5 selects the high side control select signal PHS as the high side control signal HS. Based on the high side control signal HS and the low side control signal LS, the high side power switch Q10 is turned off and the low side power switch M2 is turned on. At this time, the battery 203 powers the load via the inductor L1, and the current flowing through the inductor L1, i.e., the current flowing through the low side power switch M2, increases. Thus, the current sense signal Vcs increases. When the current sense signal Vcs reaches the CV-CC compensation signal Vcom, the peak current control signal Ip becomes logical high to reset the RS flip-flop FF1. As a result, the first control signal QA becomes logical low and the second control signal QB becomes logical high. Based on the first mode select signal MS1, the low side control signal select circuit SE4 selects the first control signal QA as the low side control signal LS and selects the second control signal GB as the high side control select signal PHS. Based on the second mode select signal MS2, the high side control signal select circuit SE5 selects the high side control select signal PHS as the high side control signal HS. Based on the high side control signal HS and the low side control signal LS, the high side power switch Q10 is turned on and the low side power switch M2 is turned off. At this time, the current flowing through the inductor L1 decreases, so does the current sense signal Vcs. At the beginning of the next switching cycle, the RS flip-flop FF1 is set by the clock signal CLK again, and the operation repeats. The operation of the bidirectional switch circuit 204 now is similar with the operation of a conventional boost converter.

Under boost discharge mode, the discharge voltage V2 is fixed to implement the CV control by fixing the discharge voltage feedback signal Vfb2 at a constant value via the error amplifier EA1. Meanwhile, the discharge current (the current flowing through the load) is fixed to implement the CC control by fixing the discharge current feedback signal Iload at a constant value via the error amplifier EA2.

When the bidirectional switch circuit 204 works under discharge mode, if the discharge voltage V2 is lower than the charge voltage V1, the bidirectional switch circuit 204 enters the discharge buck mode, and the second mode select signal MS2 is valid. At this time, the current sense signal select circuit SE3 selects the discharge mode current sense signal Vcs2 as the current sense signal Vcs to the comparison circuit 402 based on the first mode select signal MS1. The comparison circuit 402 compares the current sense signal Vcs with the CV-CC compensation signal Vcom to generate the peak current control signal Ip.

In one embodiment, during when the bidirectional switch circuit 204 works under the discharge buck mode, the dock signal CLK sets the RS flip-flop FF1 at the beginning of a switching cycle. Thus the initial value of the first control signal QA is logical high and the initial value of the second control signal QB is logical low. Based on the first mode select signal MS1, the low side control signal select circuit SE4 selects the first control signal QA as the low side control signal LS and selects the second control signal QB as the high side control select signal PHS. Based on the second mode select signal MS2, the high side control signal select circuit SE5 selects the charge voltage V1 as the high side control signal HS. That is to say, the control terminal of the high side power switch Q10 receives the charge voltage V1 under the discharge buck mode. Based on the high side control signal HS and the low side control signal LS, the high side power switch Q10 is turned off and the low side power switch M2 is turned on. At this time, the battery 203 powers the load via the inductor L1, and the current flowing through the inductor L1, i.e., the current flowing through the low side power switch M2 increases. Thus, the current sense signal Vcs increases. When the current sense signal Vcs reaches the CV-CC compensation signal Vcom, the peak current control signal Ip becomes logical high to reset the RS flip-flop FF1. As a result, the first control signal QA becomes logical low and the second control signal QB becomes logical high. Based on the first mode select signal MS1, the low side control signal select circuit SE4 selects the first control signal QA as the low side control signal LS and selects the second control signal QB as the high side control select signal PHS. Based on the second mode select signal MS2, the high side control signal select circuit SE5 still selects the charge voltage V1 as the high side control signal HS. Based on the high side control signal HS and the low side control signal LS, the high side power switch Q10 and the low side power switch M2 are both turned off. At this time, the current flowing through the inductor L1 charges the parasitic capacitor Cm of the low side power switch M2. Thus, the voltage across the parasitic capacitor Cm, i.e., the voltage Vsw at the switching terminal SW, increases. When Vsw−V1>Vth1, the first auxiliary switch Q11 is turned on to connect the body terminal BD of the high side power switch Q10 to the first terminal (the switch node SW). Thus the body potential of the high side power switch Q10 is determined. Because the high side control signal HS is equal to the charge voltage V1 and Vth0≈Vth1, Vsw−V1>Vth0. As a result, the high side power switch Q10 is turned on when the first auxiliary switch Q11 is turned on, and the energy stored in the inductor L1 is transferred to the bad. During this time, the voltage Vsw at the switching terminal SW decreases. When Vsw−V1<Vth1, the first auxiliary switch Q11 and the high side power switch Q10 are both turned off. At the beginning of the next switching cycle, the RS flip-flop FF1 is set by the dock signal CLK again, and the operation repeats.

Under buck discharge mode, the discharge voltage V2 is fixed to implement the CV control by fixing the discharge voltage feedback signal Vfb2 at a constant value via the error amplifier EA1. Meanwhile, the discharge current (the current flowing through the bad) is fixed to implement the CC control by fixing the discharge current feedback signal Road at a constant value via the error amplifier EA2.

The select circuits SE3~SE7 are familiar to persons of ordinary skill in the art. Any circuit that selects different input signals to the output terminal based on a control signal, like single-pole double-throw switch, may be used as select circuit without detracting from the merits of the present invention.

In the above embodiment, the high side power switch Q10 comprises a P-type MOSFET, and the low side power switch M2 comprises N-type MOSFET. In other embodiments, the high side power switch Q10 and the low side power switch M2 may comprise different type MOSFETs, and the logical signal provided by the control circuit 301 may be different then.

Figure 5:
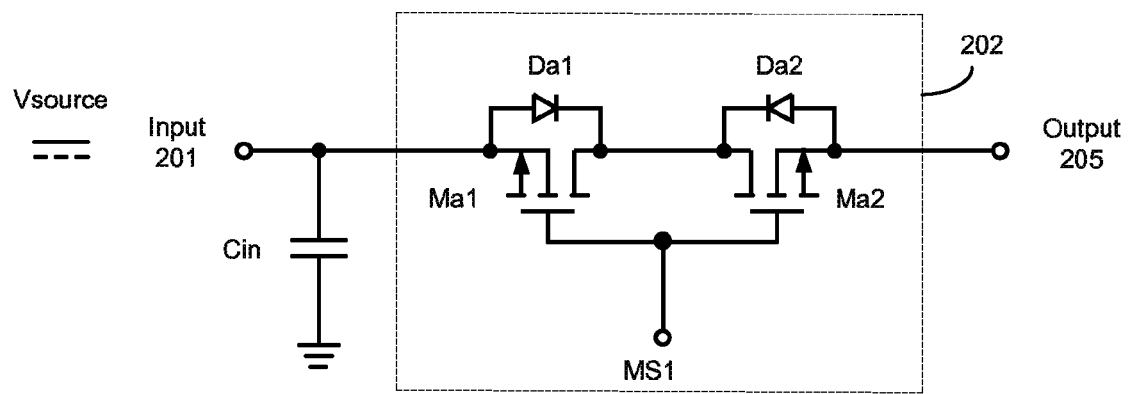
FIG. 5 schematically shows a select circuit 202 in accordance with an embodiment the present invention.

FIG. 5 schematically shows a select circuit 202 in accordance with an embodiment the present invention. The select circuit 202 comprises: a first select switch Ma1 having a first terminal, a second terminal and a control terminal, wherein the first terminal is coupled to the input terminal 201 of the power bank 20, and the control terminal is configured to receive the first mode select signal MS1; a second select switch Ma2 having a first terminal, a second terminal and a control terminal, wherein the first terminal is coupled to the output terminal 205 of the power bank 20, the second input is coupled to the second terminal of the first select switch Ma1, and the control terminal is configured to receive the first mode select signal MS1.

In one embodiment, the first select switch Ma1 comprises a body diode Da1 and the second select switch Ma2 comprises a body diode Da2. In one embodiment, the first select switch Ma1 and the second select switch Ma2 comprise N-type MOSFET.

In one embodiment, when the input terminal 201 of the power bank 20 is wired up with the power source Vsource, the first mode select signal MS1 is logical high and valid. Then the first select switch Ma1 and the second select switch Ma2 are turned on. As a result, the power source Vsource supplies power to the load, and meanwhile, charges the battery 203 via the bidirectional switch circuit 204. During this time, the body diode Da2 is cutoff to provide the over voltage protection and the over current protection to the load and the power bank when the power source Vsource is abnormal. When the input terminal 201 is disconnected from the power source Vsource, the first select switch Ma1 and the second select switch Ma2 are both turned off by the first mode select signal MS1, to prevent current flowing from the load to the input terminal 201.

In one embodiment, the power bank 20 further comprises an input capacitor Cin coupled between the input terminal 201 and the ground reference. When the battery 203 supplies power to the load, the body diode Da1 prevents current flowing from the output terminal 205 to the input terminal 201 to charge the input capacitor Gin, so that to avoid the misinterpret of whether the input terminal 201 is connected to the power source Vsource.

When the bidirectional switch circuit 204 is configured to the power bank 20, the bidirectional switch circuit 204 needs to provide firstly a constant current and then a constant voltage to the battery 203. In some applications, the bidirectional switch circuit 204 only provides constant current or constant voltage. In that case, the control circuit of the bidirectional switch circuit 204 may be different from the control circuit 301.

Figure 6:
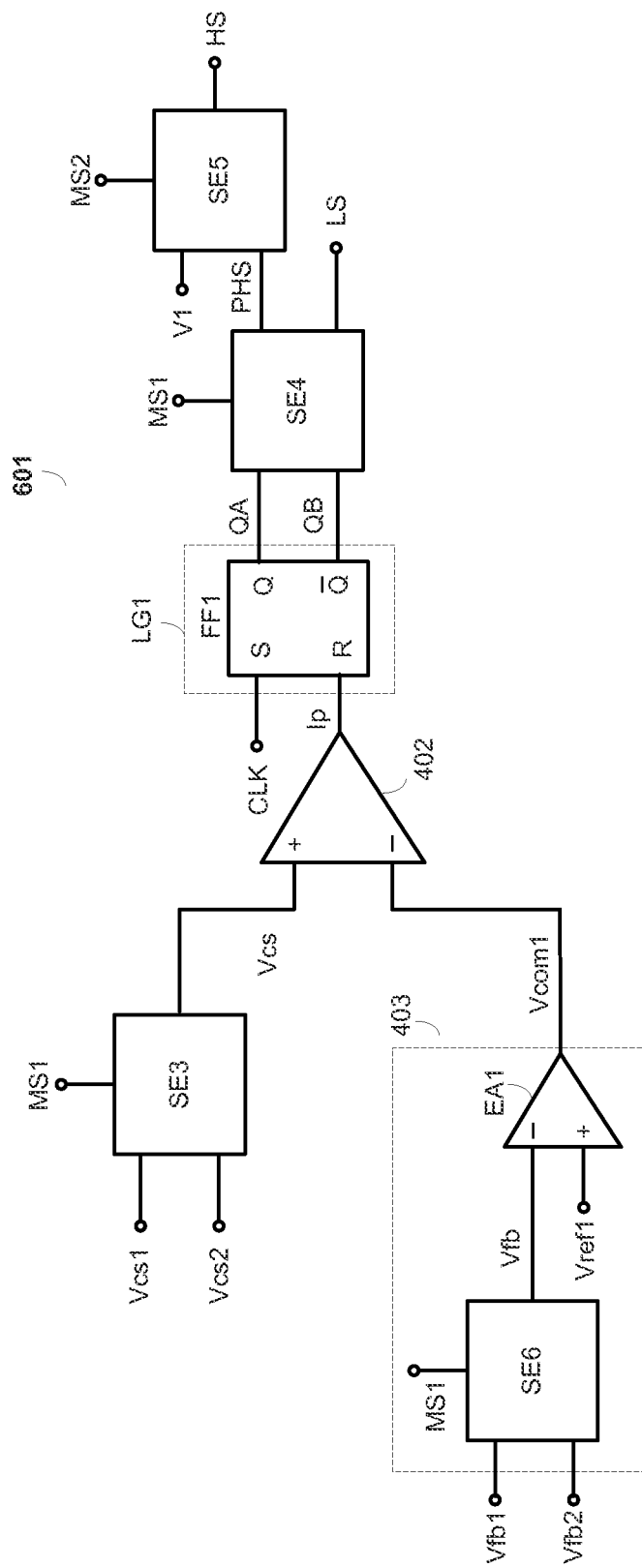
FIG. 6 schematically shows a control circuit 601 in accordance with an embodiment of the present invention.

FIG. 6 schematically shows a control circuit 601 in accordance with an embodiment of the present invention. Under the control of the control circuit 601, the bidirectional switch circuit 204 provides a constant voltage to the follow-up circuit. As shown in FIG. 6, the control circuit 601 comprises: a current sense signal select circuit SE3, having a first input terminal configured to receive the charge mode current sense signal Vcs1, a second input terminal configured to receive the discharge mode current sense signal Vcs2, a control terminal configured to receive a first mode select signal MS1, and an output terminal configured to provide the charge mode current sense signal Vcs1 or the discharge mode current sense signal Vcs2 as the current sense signal Vcs based on the first mode select signal MS1; the CV control circuit 403 having a first input terminal configured to receive the charge voltage feedback signal Vfb1 indicative of the charge voltage V1, a second input terminal configured to receive the discharge voltage feedback signal Vfb2 indicative of the discharge voltage V2, a control terminal configured to receive the first mode select signal MS1, and an output terminal configured to provide the CV compensation signal Vcom1 based on the charge voltage feedback signal Vfb1, the discharge voltage feedback signal Vfb2, and the first mode select signal MS1; the comparison circuit 402 having a first input terminal coupled to the current sense signal select circuit SE3 to receive the current sense signal Vcs, a second input terminal coupled to the CV control circuit 403 to receive the CV compensation signal Vcom1, and an output terminal configured to provide a peak current control signal Ip based on the current sense signal Vcs and the CV compensation signal Vcom1; the first logic circuit LG1 having a first input terminal configured to receive a clock signal CLK, a second input terminal coupled to the comparison circuit 402 to receive the peak current control signal Ip, a first output terminal configured to provide a first control signal QA and a second output terminal configured to provide a second control signal QB based on the clock signal CLK and the peak current control signal Ip; the low side control signal select circuit SE4 having a first input terminal coupled to the first output terminal of the first logic circuit LG1 to receive the first control signal QA, a second input terminal coupled to the second output terminal of the first logic circuit LG1 to receive the second control signal QB, a control terminal configured to receive the first mode select signal MS1, a first output terminal configured to provide the high side control select signal PHS and a second output terminal configured to provide the low side control signal LS based on the first control signal QA, the second control signal QB and the first mode select signal MS1; and a high side control signal select circuit SE5 having a first input terminal configured to receive the charge voltage signal V1, a second input terminal coupled to the low side control signal select circuit SE4 to receive the high side control select signal PHS, a control terminal configured to receive a second mode select signal MS2, and an output terminal configured to provide the high side control signal HS based on the charge voltage V1, the high side control select signal PHS and the second mode select signal MS2; wherein the bidirectional switch circuit 204 works under charge mode when the first mode select signal MS1 is valid, works under boost discharge mode when both of the first mode select signal MS1 and the second mode select signal MS2 are invalid, and works under buck discharge mode when the first mode select signal MS1 is invalid and the second mode select signal MS2 is valid.

Compared with the control circuit 301, the control circuit 601 replaces the CV-CC compensation signal Vcom with the CV compensation signal Vcom1. The operation of the control circuit 601 is similar with the operation of the control circuit 301 and is not described here for brevity.

Figure 7:
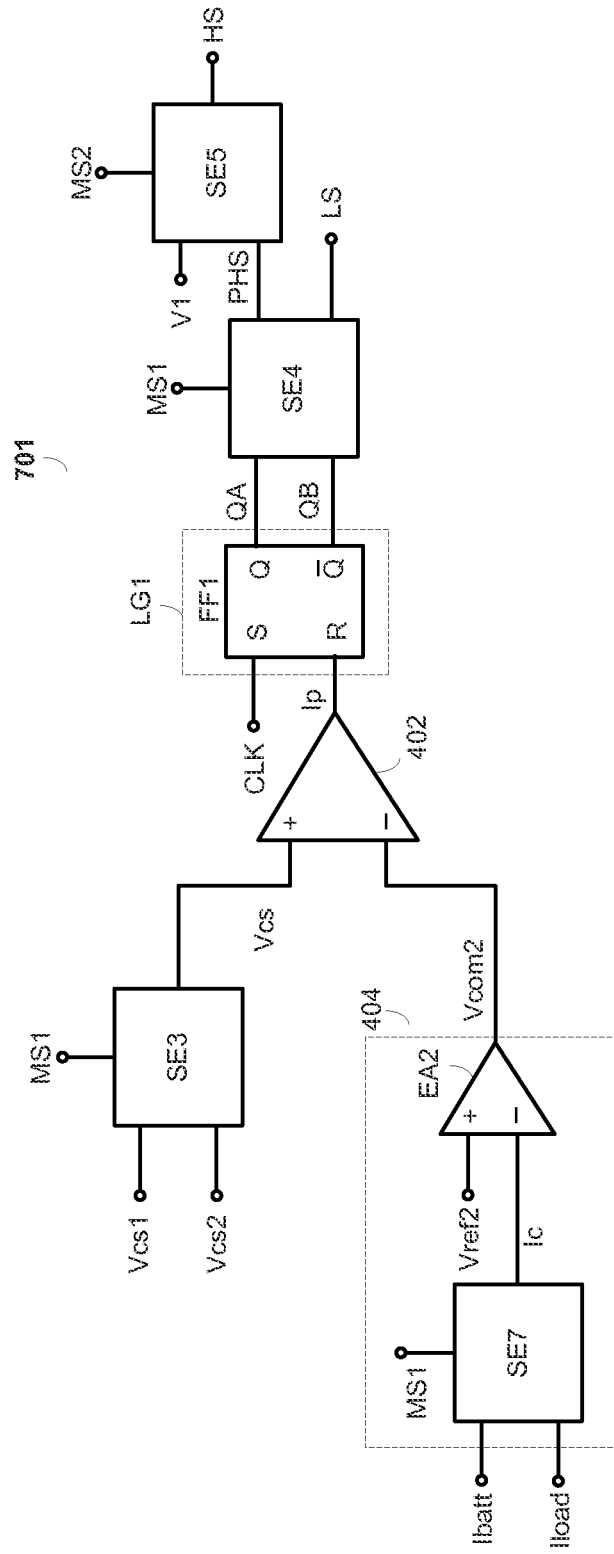
FIG. 7 schematically shows a control circuit 701 in accordance with an embodiment of the present invention.

FIG. 7 schematically shows a control circuit 701 in accordance with an embodiment of the present invention. Under the control of the control circuit 701, the bidirectional switch circuit 204 provides a constant current to the follow-up circuit. As shown in FIG. 7, the control circuit 701 comprises: the current sense signal select circuit SE3, having a first input terminal configured to receive the charge mode current sense signal Vcs1, a second input terminal configured to receive the discharge mode current sense signal Vcs2, a control terminal configured to receive a first mode select signal MS1, and an output terminal configured to provide the charge mode current sense signal Vcs1 or the discharge mode current sense signal Vcs2 as the current sense signal Vcs based on the first mode select signal MS1; the CC control circuit 404 having a first input terminal configured to receive the charge current feedback signal Ibatt indicative of the battery current, a second input terminal configured to receive the discharge current feedback signal Iload indicative of the load current, a control terminal configured to receive the first mode select signal MS1, and an output terminal configured to provide the CC compensation signal Vcom2 based on the charge current feedback signal Ibatt, the discharge current feedback signal Iload and the first mode select signal MS1; the comparison circuit 402 having a first input terminal coupled to the current sense signal select circuit SE3 to receive the current sense signal Vcs, a second input terminal coupled to the CC circuit 404 to receive the CC compensation signal Vcom2, and an output terminal configured to provide a peak current control signal Ip based on the current sense signal Vcs and the CC compensation signal Vcom2; the first logic circuit LG1 having a first input terminal configured to receive a clock signal CLK, a second input terminal coupled to the comparison circuit 402 to receive the peak current control signal Ip, a first output terminal configured to provide a first control signal QA and a second output terminal configured to provide a second control signal QB based on the clock signal CLK and the peak current control signal Ip; the low side control signal select circuit SE4 having a first input terminal coupled to the first output terminal of the first logic circuit LG1 to receive the first control signal QA, a second input terminal coupled to the second output terminal of the first logic circuit LG1 to receive the second control signal QB, a control terminal configured to receive the first mode select signal MS1, a first output terminal configured to provide a high side control select signal PHS and a second output terminal configured to provide the low side control signal LS based on the first control signal QA, the second control signal QB and the first mode select signal MS1; and a high side control signal select circuit SE5 having a first input terminal configured to receive the charge voltage signal V1, a second input terminal coupled to the lose side control signal select circuit SE4 to receive the high side control select signal PHS, a control terminal configured to receive the second mode select signal MS2, and an output terminal configured to provide the high side control signal HS based on the charge voltage V1, the high side control select signal PHS and the second mode select signal MS2; wherein the bidirectional switch circuit 204 works under charge mode when the first mode select signal MS1 is valid, works under boost discharge mode when both of the first mode select signal MS1 and the second mode select signal MS2 are invalid, and works under buck discharge mode when the first mode select signal MS1 is invalid and the second mode select signal MS2 is valid.

Compared with the control circuit 301, the control circuit 701 replaces the CV-CC compensation signal Vcom with the CC compensation signal Vcom2. The operation of the control circuit 701 is similar with the operation of the control circuit 301 and is not described here for brevity.

Figure 8:
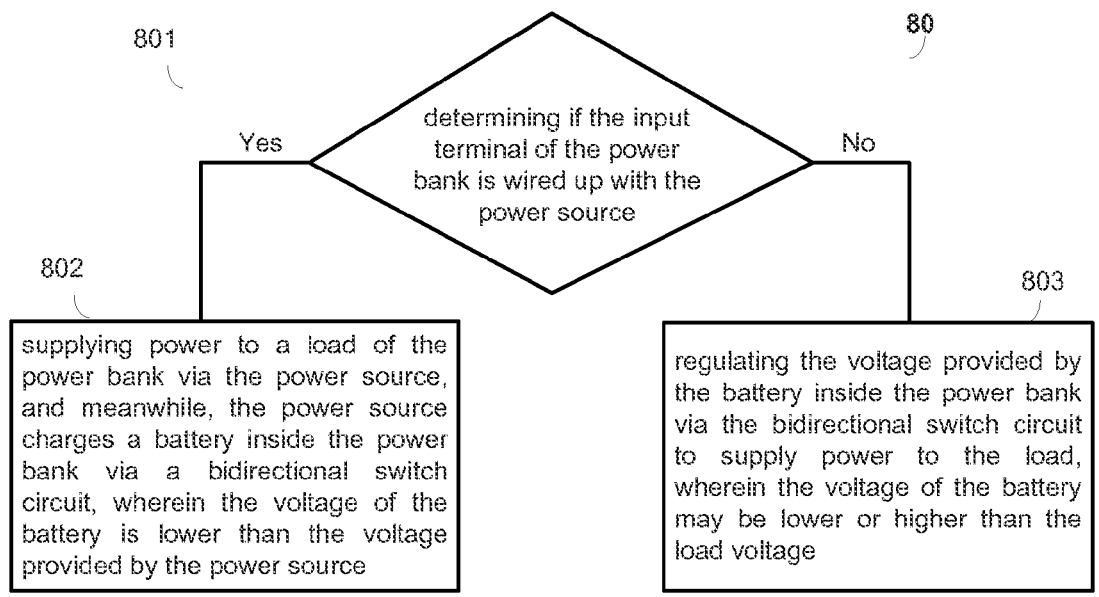
FIG. 8 shows a method 80 for controlling a power bank in accordance with an embodiment of the present invention.

FIG. 8 shows a method 80 for controlling a power bank in accordance with an embodiment of the present invention. The method 80 comprises: step 801, determining if the input terminal of the power bank is wired up with the power source, if yes, turn to step 802, otherwise, turn to step 803; step 802, supplying power to a load of the power bank via the power source, and meanwhile, the power source charges a battery inside the power bank via a bidirectional switch circuit, wherein the voltage of the battery is lower than the voltage provided by the power source; and step 803, regulating the voltage provided by the battery inside the power bank via the bidirectional switch circuit to supply power to the load, wherein the voltage of the battery may be lower or higher than the load voltage.

In one embodiment, step 801 further comprises determining if the input terminal of the power bank is wired up with the power source by determining if the voltage at the input terminal of the power bank is higher than a preset value.

Compared with the prior art power bank, the power bank in the present invention has simpler structure and lower cost. Furthermore, the bidirectional switch circuit in the present invention performs both the functions of the buck converter and the boost converter. Meanwhile, the bidirectional switch circuit in the present invention converters a higher voltage to a lower voltage with boost topology.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

We claim:

1. A bidirectional switch circuit, comprising:
   an inductor having a first terminal and a second terminal, wherein the first terminal is configured to receive a charge voltage, and the second terminal is coupled to a switch node;
   a low side power switch having a first terminal, a second terminal and a control terminal, wherein the first terminal is coupled to the switch node, the second terminal is coupled to a ground reference, and the control terminal is configured to receive a low side control signal;
   a high side power switch set having a first terminal, a second terminal, a third terminal, a fourth terminal and a control terminal, wherein the first terminal and the fourth terminal are coupled together to the switch node, the second terminal is configured to receive a discharge voltage, the third terminal is configured to receive a larger one of the charge voltage and the discharge voltage, and the control terminal is configured to receive a high side control signal; and
   a control circuit configured to provide the high side control signal and the low side control signal respectively to the high side power switch set and the low side power switch.

2. The bidirectional switch circuit of claim 1, wherein high side power switch set comprises:
   a high side power switch having a first terminal, a second terminal, a third terminal and a control terminal, wherein the first terminal is coupled to the switch node, the second terminal is configured to receive the discharge voltage, and the control terminal is configured to receive the high side control signal;
   a first auxiliary switch having a first terminal, a second terminal and a control terminal, wherein the first terminal is coupled to the third terminal of the high side power switch, the second terminal is coupled to the switch node, and the control terminal is configured to receive the larger one of the charge voltage and the discharge voltage;
   a second auxiliary switch having a first terminal, a second terminal and a control terminal, wherein the first terminal is coupled to the third terminal of the high side power switch, the second terminal is configured to receive the discharge voltage, and the control terminal is coupled to the switch node; and
   a third auxiliary switch having a first terminal, a second terminal and a control terminal, wherein the first terminal is coupled to the third terminal of the high side power switch, the second terminal is configured to receive the discharge voltage, and the control terminal is coupled to the third terminal of the high side power switch when the charge voltage is higher than or equal to the discharge voltage, and is coupled to the ground reference when the charge voltage is lower than the discharge voltage.

3. The bidirectional switch circuit of claim 1, wherein the control circuit comprises:
   a current sense signal select circuit, having a first input terminal configured to receive a charge mode current sense signal, a second input terminal configured to receive a discharge mode current sense signal, a control terminal configured to receive a first mode select signal, and an output terminal configured to provide the charge mode current sense signal or the discharge mode current sense signal as a current sense signal based on the first mode select signal;
   a CV-CC (constant-voltage and constant-current) control circuit having a first input terminal configured to receive a charge voltage feedback signal indicative of the charge voltage, a second input terminal configured to receive a discharge voltage feedback signal indicative of the discharge voltage, a third input terminal configured to receive a charge current feedback signal, a fourth input terminal configured to receive a discharge current feedback signal, a fifth input terminal configured to receive the first mode select signal, and an output terminal configured to provide a CV-CC compensation signal based on the charge voltage feedback signal, the discharge voltage feedback signal, the charge current feedback signal, the discharge current feedback signal and the first mode select signal;
   a comparison circuit having a first input terminal coupled to the current sense signal select circuit to receive the current sense signal, a second input terminal coupled to the CV-CC control circuit to receive the CV-CC compensation signal, and an output terminal configured to provide a peak current control signal based on the current sense signal and the CV-CC compensation signal;
   a first logic circuit having a first input terminal configured to receive a clock signal, a second input terminal coupled to the comparison circuit to receive the peak current control signal, a first output terminal configured to provide a first control signal and a second output terminal configured to provide a second control signal based on the clock signal and the peak current control signal;
   a low side control signal select circuit having a first input terminal coupled to the first output terminal of the first logic circuit to receive the first control signal, a second input terminal coupled to the second output terminal of the first logic circuit to receive the second control signal, a control terminal configured to receive the first mode select signal, a first output terminal configured to provide a high side control select signal and a second output terminal configured to provide the low side control signal based on the first control signal, the second control signal and the first mode select signal; and
   a high side control signal select circuit having a first input terminal configured to receive the charge voltage, a second input terminal coupled to the low side control signal select circuit to receive the high side control select signal, a control terminal configured to receive a second mode select signal, and an output terminal configured to provide the high side control signal based on the charge voltage, the high side control select signal and the second mode select signal;
   wherein the bidirectional switch circuit works under the charge mode when the first mode select signal is valid, works under boost discharge mode when both of the first mode select signal and the second mode select signal are invalid, and works under buck discharge mode when the first mode select signal is invalid and the second mode select signal is valid.

4. The bidirectional switch circuit of claim 3, wherein the CV-CC control circuit comprises:
- a CV (constant voltage) control circuit having a first input terminal configured to receive the charge voltage feedback signal indicative of the charge voltage, a second input terminal configured to receive the discharge voltage feedback signal indicative of the discharge voltage, a control terminal configured to receive the first mode select signal, and an output terminal configured to provide a CV compensation signal based on the charge voltage feedback signal, the discharge voltage feedback signal, and the first mode select signal;
- a CC (constant current) control circuit having a first input terminal configured to receive the charge current feedback signal, a second input terminal configured to receive the discharge current feedback signal, a control terminal configured to receive the first mode select signal, and an output terminal configured to provide a CC compensation signal based on the charge current feedback signal, the discharge current feedback signal and the first mode select signal; and
- a compensation signal select circuit having a first input terminal coupled to the CV control circuit to receive the CV compensation signal, a second input terminal configured to receive the CC compensation signal, and an output terminal configured to provide the CV-CC compensation signal based on the CV compensation signal and the CC compensation signal.

5. The bidirectional switch circuit of claim 4, wherein the CV control circuit comprises:
- a voltage feedback signal select circuit having a first input terminal configured to receive the charge voltage feedback signal, a second input terminal configured to receive the discharge voltage feedback signal, a control terminal configured to receive the first mode select signal, and an output terminal configured to provide the charge voltage feedback signal as a voltage feedback signal when the first mode select signal is valid, and to provide the discharge voltage feedback signal as the voltage feedback signal when the first mode select signal is invalid; and
- a feedback voltage error amplifier having a first input terminal coupled to the voltage feedback signal select circuit to receive the voltage feedback signal, a second input terminal configured to receive a feedback voltage reference signal, and an output terminal configured to provide the CV compensation signal based on the voltage feedback signal and the feedback voltage reference signal.

6. The bidirectional switch circuit of claim 4, wherein the CC control circuit comprises:
- a current feedback signal select circuit having a first input terminal configured to receive the charge current feedback signal, a second input terminal configured to receive the discharge current feedback signal, a control terminal configured to receive the first mode select signal, and an output terminal configured to provide the charge current feedback signal as a current feedback signal when the first mode select signal is valid, and to provide the discharge current feedback signal as the current feedback signal when the first mode select signal is invalid; and
- a feedback current error amplifier having a first input terminal coupled to the current feedback signal select circuit to receive the current feedback signal, a second input terminal configured to receive a feedback current reference signal, and an output terminal configured to provide the CC compensation signal based on the current feedback signal and the feedback current reference signal.

7. The bidirectional switch circuit of claim 4, wherein the compensation signal select circuit comprises:
- a first select diode having an anode terminal and a cathode terminal, wherein the cathode terminal is coupled to the CV control circuit to receive the CV compensation signal; and
- a second select diode having an anode terminal and a cathode terminal, wherein the cathode terminal is coupled to the CC control circuit to receive the CC compensation signal;
- wherein the anode terminals of the first select diode and the second select diode are coupled together to provide the CV-CC compensation signal.

8. The bidirectional switch circuit of claim 1, wherein the control circuit comprises:
- a current sense signal select circuit, having a first input terminal configured to receive a charge mode current sense signal, a second input terminal configured to receive a discharge mode current sense signal, a control terminal configured to receive a first mode select signal, and an output terminal configured to provide the charge mode current sense signal or the discharge mode current sense signal as a current sense signal based on the first mode select signal;
- a CV (constant voltage) control circuit having a first input terminal configured to receive a charge voltage feedback signal indicative of the charge voltage, a second input terminal configured to receive a discharge voltage feedback signal indicative of the discharge voltage, a control terminal configured to receive the first mode select signal, and an output terminal configured to provide a CV compensation signal based on the charge voltage feedback signal, the discharge voltage feedback signal, and the first mode select signal;
- a comparison circuit having a first input terminal coupled to the current sense signal select circuit to receive the current sense signal, a second input terminal coupled to the CV control circuit to receive the CV compensation signal, and an output terminal configured to provide a peak current control signal based on the current sense signal and the CV compensation signal;
- a first logic circuit having a first input terminal configured to receive a clock signal, a second input terminal coupled to the comparison circuit to receive the peak current control signal, a first output terminal configured to provide a first control signal and a second output terminal configured to provide a second control signal based on the clock signal and the peak current control signal;
- a low side control signal select circuit having a first input terminal coupled to the first output terminal of the first logic circuit to receive the first control signal, a second input terminal coupled to the second output terminal of the first logic circuit to receive the second control signal, a control terminal configured to receive the first mode select signal, a first output terminal configured to provide a high side control select signal and a second output terminal configured to provide the low side control signal based on the first control signal, the second control signal and the first mode select signal; and a high side control signal select circuit having a first input terminal configured to receive the charge voltage signal, a second input terminal coupled to the low side control signal select circuit to receive the high side control select signal, a control terminal configured to receive a second mode select signal, and an output terminal configured to provide the high side control signal based on the charge voltage, the high side control select signal and the second mode select signal;

wherein the bidirectional switch circuit works under the charge mode when the first mode select signal is valid, works under boost discharge mode when both of the first mode select signal and the second mode select signal are invalid, and works under buck discharge mode when the first mode select signal is invalid and the second mode select signal is valid.

9. The bidirectional switch circuit of claim 8, wherein the CV control circuit comprises:

a voltage feedback signal select circuit having a first input terminal configured to receive the charge voltage feedback signal, a second input terminal configured to receive the discharge voltage feedback signal, a control terminal configured to receive the first mode select signal, and an output terminal configured to provide the charge voltage feedback signal as a voltage feedback signal when the first mode select signal is valid, and to provide the discharge voltage feedback signal as the voltage feedback signal when the first mode select signal is invalid; and a feedback voltage error amplifier having a first input terminal coupled to the voltage feedback signal select circuit to receive the voltage feedback signal, a second input terminal configured to receive a feedback voltage reference signal, and an output terminal configured to provide the CV compensation signal based on the voltage feedback signal and the feedback voltage reference signal.

10. The bidirectional switch circuit of claim 1, wherein the control circuit comprises:

a current sense signal select circuit, having a first input terminal configured to receive a charge mode current sense signal, a second input terminal configured to receive a discharge mode current sense signal, a control terminal configured to receive a first mode select signal, and an output terminal configured to provide the charge mode current sense signal or the discharge mode current sense signal as a current sense signal based on the first mode select signal;

a CC (constant current) control circuit having a first input terminal configured to receive a charge current feedback signal, a second input terminal configured to receive a discharge current feedback signal, a control terminal configured to receive the first mode select signal, and an output terminal configured to provide a CC compensation signal based on the charge current feedback signal, the discharge current feedback signal and the first mode select signal;

a comparison circuit having a first input terminal coupled to the current sense signal select circuit to receive the current sense signal, a second input terminal coupled to the CC control circuit to receive the CC compensation signal, and an output terminal configured to provide a peak current control signal based on the current sense signal and the CC compensation signal;

a first logic circuit having a first input terminal configured to receive a clock signal, a second input terminal coupled to the comparison circuit to receive the peak current control signal, a first output terminal configured to provide a first control signal and a second output terminal configured to provide a second control signal based on the clock signal and the peak current control signal;

a low side control signal select circuit having a first input terminal coupled to the first output terminal of the first logic circuit to receive the first control signal, a second input terminal coupled to the second output terminal of the first logic circuit to receive the second control signal, a control terminal configured to receive the first mode select signal, a first output terminal configured to provide a high side control select signal and a second output terminal configured to provide the low side control signal based on the first control signal, the second control signal and the first mode select signal; and a high side control signal select circuit having a first input terminal configured to receive the charge voltage, a second input terminal coupled to the low side control signal select circuit to receive the high side control select signal, a control terminal configured to receive a second mode select signal, and an output terminal configured to provide the high side control signal based on the charge voltage, the high side control select signal and the second mode select signal;

wherein the bidirectional switch circuit works under the charge mode when the first mode select signal is valid, works under boost discharge mode when both of the first mode select signal and the second mode select signal are invalid, and works under buck discharge mode when the first mode select signal is invalid and the second mode select signal is valid.

11. The bidirectional switch circuit of claim 10, wherein the CC control circuit comprises:

a current feedback signal select circuit having a first input terminal configured to receive the charge current feedback signal, a second input terminal configured to receive the discharge current feedback signal, a control terminal configured to receive the first mode select signal, and an output terminal configured to provide the charge current feedback signal as a current feedback signal when the first mode select signal is valid, and to provide the discharge current feedback signal as the current feedback signal when the first mode select signal is invalid; and a feedback current error amplifier having a first input terminal coupled to the current feedback signal select circuit to receive the current feedback signal, a second input terminal configured to receive a feedback current reference signal, and an output terminal configured to provide the CC compensation signal based on the current feedback signal and the feedback current reference signal.

12. A power bank, comprising:

an input terminal;

an output terminal;

a battery;

a bidirectional switch circuit having a first terminal coupled to the battery, and a second terminal coupled to the output terminal of the power bank; and a select circuit having a first terminal coupled to the input terminal of the power bank, and a second terminal coupled to the output terminal of the power bank;

wherein when the input terminal is wired up with a power source, the bidirectional switch circuit works under charge mode that the select circuit connects the input terminal to the output terminal, and a load coupled to the output terminal is powered by the power source, and meanwhile, the battery is charged by the power source via the select circuit and the bidirectional switch circuit; when the input terminal is disconnected from the power source, the bidirectional switch circuit works under discharge mode that the select circuit disconnects the input terminal and the output terminal, and the load is powered by the battery via the bidirectional switch circuit;

wherein the bidirectional switch circuit comprises:

an inductor having a first terminal and a second terminal, wherein the first terminal is coupled to a first power device to receive a charge voltage, and the second terminal is coupled to a switch node;

a low side power switch having a first terminal, a second terminal and a control terminal, wherein the first terminal is coupled to the switch node, the second terminal is coupled to a ground reference, and the control terminal is configured to receive a low side control signal;

a high side power switch set having a first terminal, a second terminal, a third terminal, a fourth terminal and a control terminal, wherein the first terminal and the fourth terminal are coupled together to the switch node, the second terminal is coupled to a second power device to receive a discharge voltage, the third terminal is configured to receive a larger one of the charge voltage and the discharge voltage, and the control terminal is configured to receive a high side control signal; and a control circuit configured to provide the high side control signal and the low side control signal respectively to the high side power switch set and the low side power switch.

13. The power bank of claim 12, wherein high side power switch set comprises:

a high side power switch having a first terminal, a second terminal, a third terminal and a control terminal, wherein the first terminal is coupled to the switch node, the second terminal is configured to receive the discharge voltage, and the control terminal is configured to receive the high side control signal;

a first auxiliary switch having a first terminal, a second terminal and a control terminal, wherein the first terminal is coupled to the third terminal of the high side power switch, the second terminal is coupled to the switch node, and the control terminal is configured to receive the larger one of the charge voltage and the discharge voltage;

a second auxiliary switch having a first terminal, a second terminal and a control terminal, wherein the first terminal is coupled to the third terminal of the high side power switch, the second terminal is configured to receive the discharge voltage, and the control terminal is coupled to the switch node; and a third auxiliary switch having a first terminal, a second terminal and a control terminal, wherein the first terminal is coupled to the third terminal of the high side power switch, the second terminal is configured to receive the discharge voltage, and the control terminal is coupled to the third terminal of the high side power switch when the charge voltage is higher than or equal to the discharge voltage, and is coupled to the ground reference when the charge voltage is lower than the discharge voltage.

14. The power bank of claim 12, wherein the control circuit comprises:

a current sense signal select circuit, having a first input terminal configured to receive a charge mode current sense signal, a second input terminal configured to receive a discharge mode current sense signal, a control terminal configured to receive a first mode select signal, and an output terminal configured to provide the charge mode current sense signal or the discharge mode current sense signal as a current sense signal based on the first mode select signal;

a CV-CC (constant-voltage and constant-current) control circuit having a first input terminal configured to receive a charge voltage feedback signal indicative of the charge voltage, a second input terminal configured to receive a discharge voltage feedback signal indicative of the discharge voltage, a third input terminal configured to receive a charge current feedback signal, a fourth input terminal configured to receive a discharge current feedback signal, a fifth input terminal configured to receive the first mode select signal, and an output terminal configured to provide a CV-CC compensation signal based on the charge voltage feedback signal, the discharge voltage feedback signal, the charge current feedback signal, the discharge current feedback signal and the first mode select signal;

a comparison circuit having a first input terminal coupled to the current sense signal select circuit to receive the current sense signal, a second input terminal coupled to the CV-CC control circuit to receive the CV-CC compensation signal, and an output terminal configured to provide a peak current control signal based on the current sense signal and the CV-CC compensation signal;

a first logic circuit having a first input terminal configured to receive a clock signal, a second input terminal coupled to the comparison circuit to receive the peak current control signal, a first output terminal configured to provide a first control signal and a second output terminal configured to provide a second control signal based on the clock signal and the peak current control signal;

a low side control signal select circuit having a first input terminal coupled to the first output terminal of the first logic circuit to receive the first control signal, a second input terminal coupled to the second output terminal of the first logic circuit to receive the second control signal, a control terminal configured to receive the first mode select signal, a first output terminal configured to provide a high side control select signal and a second output terminal configured to provide the low side control signal based on the first control signal, the second control signal and the first mode select signal; and a high side control signal select circuit having a first input terminal configured to receive the charge voltage, a second input terminal coupled to the low side control signal select circuit to receive the high side control select signal, a control terminal configured to receive a second mode select signal, and an output terminal configured to provide the high side control signal based on the charge voltage, the high side control select signal and the second mode select signal;

wherein the bidirectional switch circuit works under the charge mode when the first mode select signal is valid, works under boost discharge mode when both of the first mode select signal and the second mode select signal are invalid, and works under buck discharge mode when the first mode select signal is invalid and the second mode select signal is valid.

15. The power bank of claim 14, wherein the CV-CC control circuit comprises:
   a CV (constant voltage) control circuit having a first input terminal configured to receive the charge voltage feedback signal indicative of the charge voltage, a second input terminal configured to receive the discharge voltage feedback signal indicative of the discharge voltage, a control terminal configured to receive the first mode select signal, and an output terminal configured to provide a CV compensation signal based on the charge voltage feedback signal, the discharge voltage feedback signal, and the first mode select signal;
   a CC (constant current) control circuit having a first input terminal configured to receive the charge current feedback signal, a second input terminal configured to receive the discharge current feedback signal, a control terminal configured to receive the first mode select signal, and an output terminal configured to provide a CC compensation signal based on the charge current feedback signal, the discharge current feedback signal and the first mode select signal; and
   a compensation signal select circuit having a first input terminal coupled to the CV control circuit to receive the CV compensation signal, a second input terminal configured to receive the CC compensation signal, and an output terminal configured to provide the CV-CC compensation signal based on the CV compensation signal and the CC compensation signal.

16. The power bank of claim 15, wherein the CV control circuit comprises:
   a voltage feedback signal select circuit having a first input terminal configured to receive the charge voltage feedback signal, a second input terminal configured to receive the discharge voltage feedback signal, a control terminal configured to receive the first mode select signal, and an output terminal configured to provide the charge voltage feedback signal as the voltage feedback signal when the first mode select signal is valid, and to provide the discharge voltage feedback signal as a voltage feedback signal when the first mode select signal is invalid; and
   a feedback voltage error amplifier having a first input terminal coupled to the voltage feedback signal select circuit to receive the voltage feedback signal, a second input terminal configured to receive a feedback voltage reference signal, and an output terminal configured to provide the CV compensation signal based on the voltage feedback signal and the feedback voltage reference signal.

17. The power bank of claim 15, wherein the CC control circuit comprises:
   a current feedback signal select circuit having a first input terminal configured to receive the charge current feedback signal, a second input terminal configured to receive the discharge current feedback signal, a control terminal configured to receive the first mode select signal, and an output terminal configured to provide the charge current feedback signal as a current feedback signal when the first mode select signal is valid, and to provide the discharge current feedback signal as the current feedback signal when the first mode select signal is invalid; and
   a feedback current error amplifier having a first input terminal coupled to the current feedback signal select circuit to receive the current feedback signal, a second input terminal configured to receive a feedback current reference signal, and an output terminal configured to provide the CC compensation signal based on the current feedback signal and the feedback current reference signal.

18. The power bank of claim 13, wherein the control circuit comprises:
   a current sense signal select circuit, having a first input terminal configured to receive a charge mode current sense signal, a second input terminal configured to receive a discharge mode current sense signal, a control terminal configured to receive a first mode select signal, and an output terminal configured to provide the charge mode current sense signal or the discharge mode current sense signal as a current sense signal based on the first mode select signal;
   a CV (constant voltage) control circuit having a first input terminal configured to receive a charge voltage feedback signal indicative of the charge voltage, a second input terminal configured to receive a discharge voltage feedback signal indicative of the discharge voltage, a control terminal configured to receive the first mode select signal, and an output terminal configured to provide a CV compensation signal based on the charge voltage feedback signal, the discharge voltage feedback signal, and the first mode select signal;
   a comparison circuit having a first input terminal coupled to the current sense signal select circuit to receive the current sense signal, a second input terminal coupled to the CV control circuit to receive the CV compensation signal, and an output terminal configured to provide a peak current control signal based on the current sense signal and the CV compensation signal;
   a first logic circuit having a first input terminal configured to receive a clock signal, a second input terminal coupled to the comparison circuit to receive the peak current control signal, a first output terminal configured to provide a first control signal and a second output terminal configured to provide a second control signal based on the clock signal and the peak current control signal;
   a low side control signal select circuit having a first input terminal coupled to the first output terminal of the first logic circuit to receive the first control signal, a second input terminal coupled to the second output terminal of the first logic circuit to receive the second control signal, a control terminal configured to receive the first mode select signal, a first output terminal configured to provide a high side control select signal and a second output terminal configured to provide the low side control signal based on the first control signal, the second control signal and the first mode select signal; and
   a high side control signal select circuit having a first input terminal configured to receive the charge voltage, a second input terminal coupled to the low side control signal select circuit to receive the high side control select signal, a control terminal configured to receive a second mode select signal, and an output terminal configured to provide the high side control signal based on the charge voltage, the high side control select signal and the second mode select signal;
   wherein the bidirectional switch circuit works under the charge mode when the first mode select signal is valid, works under boost discharge mode when both of the first mode select signal and the second mode select signal are invalid, and works under buck discharge mode when the first mode select signal is invalid and the second mode select signal is valid.

19. The power bank of claim 12, wherein the control circuit comprises:
- a current sense signal select circuit, having a first input terminal configured to receive a charge mode current sense signal, a second input terminal configured to receive a discharge mode current sense signal, a control terminal configured to receive a first mode select signal, and an output terminal configured to provide the charge mode current sense signal or the discharge mode current sense signal as a current sense signal based on the first mode select signal;
- a CC (constant current) control circuit having a first input terminal configured to receive a charge current feedback signal, a second input terminal configured to receive a discharge current feedback signal, a control terminal configured to receive the first mode select signal, and an output terminal configured to provide a CC compensation signal based on the charge current feedback signal, the discharge current feedback signal and the first mode select signal;
- a comparison circuit having a first input terminal coupled to the current sense signal select circuit to receive the current sense signal, a second input terminal coupled to the CC control circuit to receive the CC compensation signal, and an output terminal configured to provide a peak current control signal based on the current sense signal and the CC compensation signal;
- a first logic circuit having a first input terminal configured to receive a clock signal, a second input terminal coupled to the comparison circuit to receive the peak current control signal, a first output terminal configured to provide a first control signal and a second output terminal configured to provide a second control signal based on the clock signal and the peak current control signal;
- a low side control signal select circuit having a first input terminal coupled to the first output terminal of the first logic circuit to receive the first control signal, a second input terminal coupled to the second output terminal of the first logic circuit to receive the second control signal, a control terminal configured to receive the first mode select signal, a first output terminal configured to provide a high side control select signal and a second output terminal configured to provide the low side control signal based on the first control signal, the second control signal and the first mode select signal; and
- a high side control signal select circuit having a first input terminal configured to receive the charge voltage, a second input terminal coupled to the low side control signal select circuit to receive the high side control select signal, a control terminal configured to receive a second mode select signal, and an output terminal configured to provide the high side control signal based on the charge voltage, the high side control select signal and the second mode select signal;
  - wherein the bidirectional switch circuit works under the charge mode when the first mode select signal is valid, works under boost discharge mode when both of the first mode select signal and the second mode select signal are invalid, and works under buck discharge mode when the first mode select signal is invalid and the second mode select signal is valid.

* * * * *